United States Patent [19]

Inui et al.

[11] Patent Number: 5,112,727
[45] Date of Patent: May 12, 1992

[54] METHOD OF AND PHOTOMASK FOR MANUFACTURING OPTICAL MEMORY ELEMENT

[75] Inventors: Tetsuya Inui; Junji Hirokane; Akira Shibata; Yoshiyuki Nagahara; Kenji Ohta, all of Nara, Japan

[73] Assignee: Sharp Kabushiki Kaisha, Osaka, Japan

[21] Appl. No.: 527,265

[22] Filed: May 23, 1990

Related U.S. Application Data

[62] Division of Ser. No. 278,378, Dec. 1, 1988, Pat. No. 4,946,730.

[30] Foreign Application Priority Data

Dec. 4, 1987 [JP] Japan .................. 62-307127

[51] Int. Cl.⁵ .............................. G03C 5/00
[52] U.S. Cl. ..................... 430/321; 430/5; 430/322; 430/495; 428/64; 428/65; 369/284; 369/288; 346/76 L; 346/135.1
[58] Field of Search ............ 430/5, 321; 428/64, 428/65; 369/284, 288; 346/76 L, 135.1

[56] References Cited

U.S. PATENT DOCUMENTS

| | | |
|---|---|---|
| 4,223,347 | 9/1980 | Bouwhuis et al. ............ 358/342 |
| 4,619,804 | 10/1986 | Leonard et al. ............ 430/5 |
| 4,778,747 | 10/1988 | Ohta et al. ............ 430/5 |
| 4,797,316 | 1/1989 | Hecq et al. ............ 430/321 |
| 4,839,251 | 6/1989 | Ohta et al. ............ 430/5 |
| 4,914,645 | 4/1990 | Getreuer et al. ............ 369/44.26 |
| 4,925,776 | 5/1990 | Ohta et al. ............ 430/5 |
| 4,946,730 | 8/1990 | Inui et al. ............ 428/64 |
| 4,959,823 | 9/1990 | Getreuer et al. ............ 369/44.26 |

FOREIGN PATENT DOCUMENTS

| | | | |
|---|---|---|---|
| 0155000 | 9/1985 | European Pat. Off. ............ 430/5 |
| 0214824 | 8/1986 | European Pat. Off. . | |
| 0310412 | 4/1989 | European Pat. Off. ............ 430/5 |
| 61-80631 | 4/1986 | Japan . | |

OTHER PUBLICATIONS

"Webster's New World Dictionary", Third College Edition, 1988, Simon & Schuster Inc.
"Introduction to Microlithography"; Thompson, Wilson & Bowden, ACS Symposium Series 219, American Chemical Society, 1983.
"Integrated Circuit Fabrication Technology"; Elliott; McGraw-Hill Book Company; 1982.

Primary Examiner—Charles L. Bowers, Jr.
Assistant Examiner—Thomas R. Neville

[57] ABSTRACT

A method of and a photomask for manufacturing an optical memory element. The manufacturing method includes the steps of: subjecting a positive type photoresist coated on a glass substrate to exposure by using the photomask capable of irradiating light onto a portion of the photoresist other than the remaining portion for forming pits of the glass substrate such that the portion of the photoresist is solubilized against developing solution; developing the photoresist by using the developing solution so as to remove the portion of the photoresist; and etching the glass substrate so as to directly form, as convex portions, the pits on a surface of the glass substrate.

13 Claims, 7 Drawing Sheets

PRIOR ART

METHOD OF AND PHOTOMASK FOR MANUFACTURING OPTICAL MEMORY ELEMENT

This application is a divisional of copending application Ser. No. 07/278,378, filed on Dec. 1, 1988, now U.S. Pat. No. 4,946,730.

BACKGROUND OF THE INVENTION

The present invention relates to a method of manufacturing an optical memory element enabling at least one of recording, reproduction and erasure of information and a photomask used directly for manufacture of the optical memory element.

In recent years, optical disks for performing reproduction, etc. of information by using laser beams have been greatly developed. In an optical disk, a thin film of recording medium is deposited on a plastic substrate made of polycarbonate or acrylic resin and a protective member is formed on the thin film in close contact therewith. A spot of laser beams converged to a diameter of about 1 μm is irradiated onto the optical disk rotating on an optical disk player such that recording, reproduction and erasure of information are performed.

Meanwhile, when the optical disk is being rotated by a rotary motor, tracks on the optical disk are likely to vibrate in axial and radial directions of the rotary motor due to distortion of the optical disk or run-out of the rotary motor. Therefore, unless a countermeasure for preventing this vibration of the optical disk is taken, the spot of laser beams cannot follow the tracks accurately. This is partly because the tracks on the optical disk are formed at an excessively minute pitch of about 1.6 μm.

Thus, conventionally, an optical disk device is usually provided with a system for causing, through detection of vibration of the optical disk, the spot of laser beams to automatically follow signal pits recorded along the tracks, i.e. a so-called servo system. The servo system is of either a continuous servo type or a sampled servo type.

In the continuous servo type, grooves are formed spirally or coaxially on the optical disk such that the spot of laser beams follows the grooves. On the other hand, in the sampled servo type, pits are formed discontinuously on the surface of the optical disk such that the pits cause the spot of laser beams to follow the tracks.

FIG. 1 shows a known optical disk of sampled servo type. In the known optical disk, staggered pits (wobble pits) 2 and 3 are alternately provided at opposite sides of a track centerline 1, while a clock pit 4 is provided on the track centerline 1. As shown in FIG. 2, if the spot of laser beams travels along the track centerline 1 rightwards in FIG. 1, signal strength obtained at the time when the spot has passed through the left pit 2 becomes identical with signal strength obtained at the time when the spot has passed through the right pit 3. On the contrary, if the spot of laser beams travels along a line deviating from the track centerline 1, the above two signal strengths become different from each other. Hence, as shown in FIG. 3, if a difference between the two signal strengths is detected by a signal processing circuit 12, a signal (radial error signal) indicating the direction and how far the spot of laser beams deviates from the track centerline 1 can be obtained such that servo control in the radial direction is performed in accordance with this signal. Meanwhile, timing of sampling is determined by the clock pit 4. Servo control in the focusing direction is performed by sampling a signal obtained at the time when the spot of laser beams is located at a portion A in FIG. 1. Also in this case, timing of sampling is determined by the clock pit 4.

Meanwhile, such optical disk (optical memory element) is manufactured by two methods. In one manufacturing method, plastic such as polycarbonate, acrylic resin, etc. is subjected to injection molding. The other manufacturing method is employed for manufacture of the continuous servo type optical disk. In the latter manufacturing method, pits or grooves are directly formed on a glass substrate.

The latter manufacturing method of the optical disk is performed as shown, for example, in FIGS. 4a to 4f. Initially, as shown in FIGS. 4a and 4b, a photoresist 6 is coated on a glass substrate 5. Then, as shown in FIG. 4c, a photomask 7 having a desired pattern formed thereon is laid on the photoresist 6 in close contact therewith. Subsequently, exposure of the photoresist 6 is performed from above the photomask 7 so as to print the above mentioned pattern onto the photoresist 6. Then, as shown in FIG. 4d, the pattern printed on the photoresist 6 is developed so as to be transferred onto the photoresist 6 such that a photoresist pattern 6' is obtained. Subsequently, after the glass substrate 5 has been etched as shown in FIG. 4e, the photoresist pattern 6' is removed as shown in FIG. 4f and thus, concave and convex portions are formed on the surface of the glass substrate 5 into the desired pattern. Therefore, for example, thus obtained grooves 11 are formed concavely relative to the remaining portions on the surface of the glass substrate 5.

In the above described manufacturing method, portions having a high light transmittance and portions having a low light transmittance are formed on the photomask 7. The portions having a high light transmittance correspond to portions of the glass substrate 5, at which the pits or the grooves are formed, while the portions having a low light transmittance correspond to portions of the glass substrate 5, at which the pits or the grooves are not formed. One reason for such correspondence is that a resist having a high resolution on the order of submicrons required of the optical disk is restricted to a positive type. Namely, after development, the resist should not remain at the portions of the glass substrate 5, at which the pits are formed. Thus, if the pits are formed by using such positive type resist, portions of the photomask 7 corresponding to the pits of the glass substrate 5 should be the portions having a high light transmittance. Another reason for the above correspondence is linked with a manufacturing method of the photomask 7. In order to manufacture the photomask 7, a metallic film 9 is initially formed on a transparent substrate 8 as shown in FIG. 5a. Then, as shown in FIG. 5b, a photoresist 10 is coated on the metallic film 9. Subsequently, as shown in FIG. 5c, laser beams are irradiated onto the photoresist 10 so as to record a desired pattern on the photoresist 10. Then, after a photoresist pattern 10' has been formed by development as shown in FIG. 5d, the metallic film 9 is etched so as to obtain a pattern 9' of the metallic film 9 as shown in FIG. 5e. Subsequently, as shown in FIG. 5f, the photoresist pattern 10' is removed and thus, the above described photomask 7 is obtained.

In this manufacturing method of the photomask 7, it is needless to say that the photoresist 10 is required to have a high resolution and therefore, should be of positive type. Therefore, the portions of the photomask 7 corresponding to the portions of the glass substrate, at which the pits or the grooves 11 are formed, are necessarily the portions having a high light transmittance.

By forming on the thus obtained glass substrate 5 a recording medium enabling recording, reproduction and erasure of information, for example, a recording medium made of material utilizing phase transition between crystalline phase and amorphous phase or magnetooptical material based on perpendicular magnetization, an optical memory element is obtained. Since the above described glass substrate 5 is employed in the optical memory element and glass itself has low hygroscopicity and low gaseous transmission, deterioration of the recording medium with time is restricted, so that a highly reliable optical memory element can be obtained.

Meanwhile, when the photomask 7 is laid on the photoresist 6 coated on the glass substrate 5 so as to be brought into close contact with the photoresist 6, it is necessary to judge whether or not the photomask 7 is properly held in close contact with the photoresist 6 by visual inspection from above the photomask 7. If dust is present between the photomask 7 and the photoresist 6, interference fringes may be observed by interference of light when the photomask 7 is laid on the photoresist 6 in close contact therewith. If the glass substrate 5 having the interference fringes is subjected to exposure without eliminating the interference fringes, defective pits or grooves are formed at portions of the glass substrate 5 corresponding to the interference fringes and thus, various servo systems or reproduction signals of the optical disk are adversely affected.

Namely, it is essential for manufacture of the optical disk that inspection of close contact of the photomask 7 with the photoresist 6 is performed securely. In manufacture of the continuous servo type optical disk, since the portions of the photomask 7, which have a high light transmittance, are relatively large in number, the above inspection can be performed relatively easily.

On the other hand, in the case of the sampled servo type optical disk, since the portions of the photomask 7, which have a high light transmittance, are restricted to portions corresponding to the staggered pits 2 and 3 and the clock pits 4, light transmission of the photomask 7 as a whole is low and thus, it is difficult to perform the above inspection. Therefore, such an inconvenience is incurred that even if dust or the like is present, dust or the like cannot be found. Furthermore, such a problem arises that since inspection of close contact of the photomask 7 with the photoresist 6 is insufficient, defective optical disks may be manufactured.

SUMMARY OF THE INVENTION

In order to solve the above described disadvantages inherent in conventional manufacturing methods of the optical memory element, a method of manufacturing an optical memory element, according to one aspect of the present invention, is characterized in that when a positive type photoresist coated on a glass substrate is subjected to exposure by using a photomask capable of irradiating light onto portions of the photoresist other than the remaining portions for forming pits, hereinafter considered as physical discontinuities of the glass substrate, the portions of the photoresist are solubilized against developing solution and then are removed. Subsequently, the glass substrate is etched such that the pits are directly formed, as convex portions, on a surface of the glass substrate.

Meanwhile, in the photomask for manufacturing the optical memory element, according to another aspect of the present invention, portions for forming the pits of the glass substrate are so set as to have a lower light transmittance against exposure light than the remaining portions and are so provided as to be partially or wholly embedded in a transparent substrate.

In the method according to one aspect of the present invention, when the positive type photoresist coated on the glass substrate is subjected to exposure, the photomask capable of irradiating light onto the portions of the photoresist other than the remaining portions for forming the pits, namely, the photomask having a high light transmittance as a whole is used. Therefore, inspection of close contact of the photomask with the photoresist can be performed securely and thus, an optical memory element having high quality can be manufactured. Furthermore, in the method of the present invention, since the pits are convexly formed on the surface of the glass substrate relative to portions of the glass substrate other than the pits, track servo control or focusing servo control is performed securely.

Meanwhile, in the photomask according to another aspect of the present invention, since portions having a low light transmittance are the portions for forming the pits and the remaining portions have a high light transmittance, light transmission of the photomask as a whole is increased remarkably. Therefore, when such photomask has been laid on the photoresist on the glass substrate so as to be brought into close contact with the photoresist, the interference fringes produced by dust, etc. present between the photomask and the photoresist on the glass substrate will be clearly observed and thus, it becomes possible to prevent occurrence of defective optical memory elements preliminarily. In addition, the portions having a low light transmittance are partially or wholly embedded in the transparent substrate. Hence, in the photomask of the present invention, the portions having a low light transmittance are less likely to sustain damage or failure in comparison with an arrangement in which the portions having a low light transmittance are so formed as to project from the surface of the transparent substrate, so that the photomask can be handled with much ease and has remarkably excellent reliability.

BRIEF DESCRIPTION OF THE DRAWINGS

These features of the present invention will become apparent from the following description taken in conjunction with the preferred embodiment thereof with reference to the accompanying drawings which are given by way of illustration only, and thus are not limitative of the present invention, and wherein.

Before the description of the present invention proceeds, it is to be noted that like parts are designated by like reference numerals throughout several views of the accompanying drawings.

DETAILED DESCRIPTION OF THE INVENTION

Figure 1:
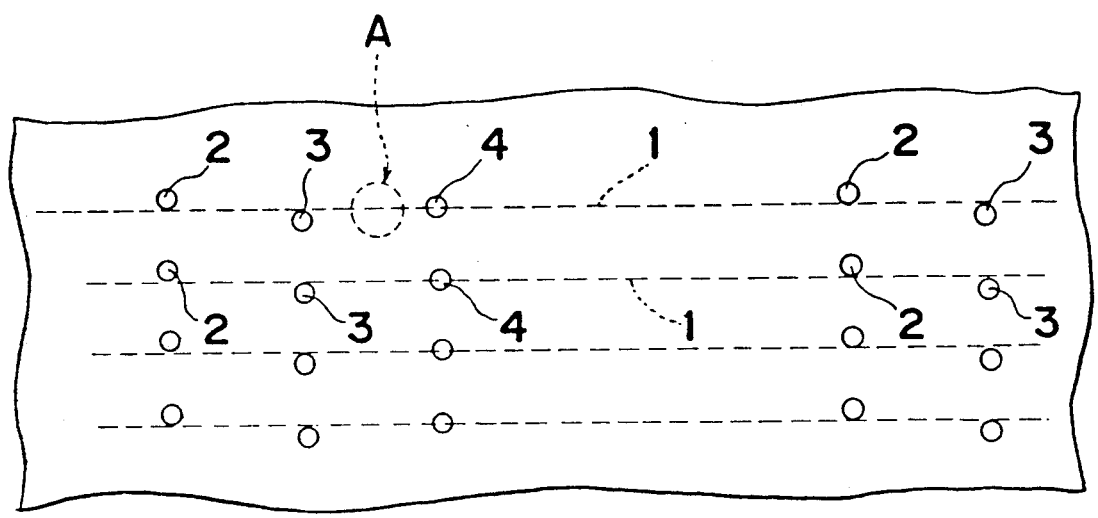
FIG. 1 is an explanatory view of an arrangement of pits in a sampled servo type optical memory element.
Figure 2:
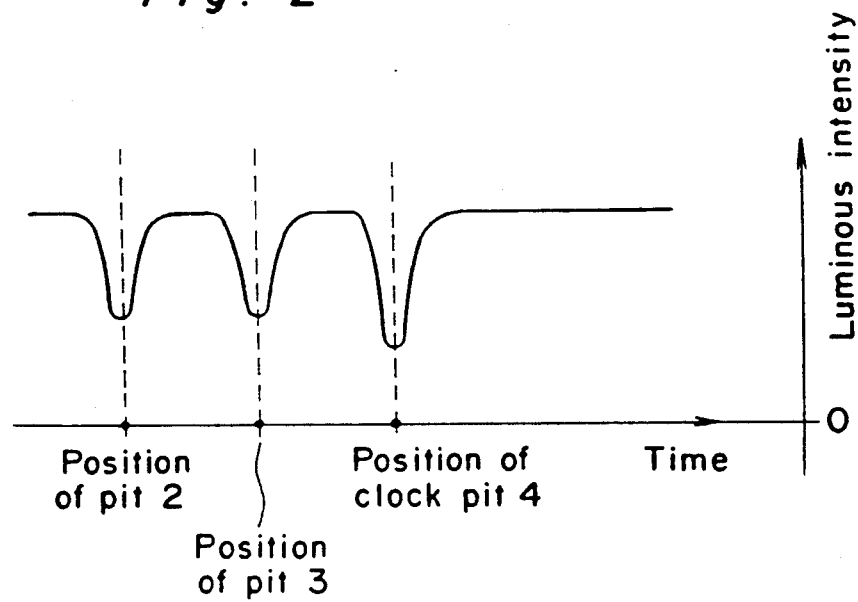
FIG. 2 is an explanatory graph of optical signal strength obtained by the pits of FIG. 1.
Figure 3:
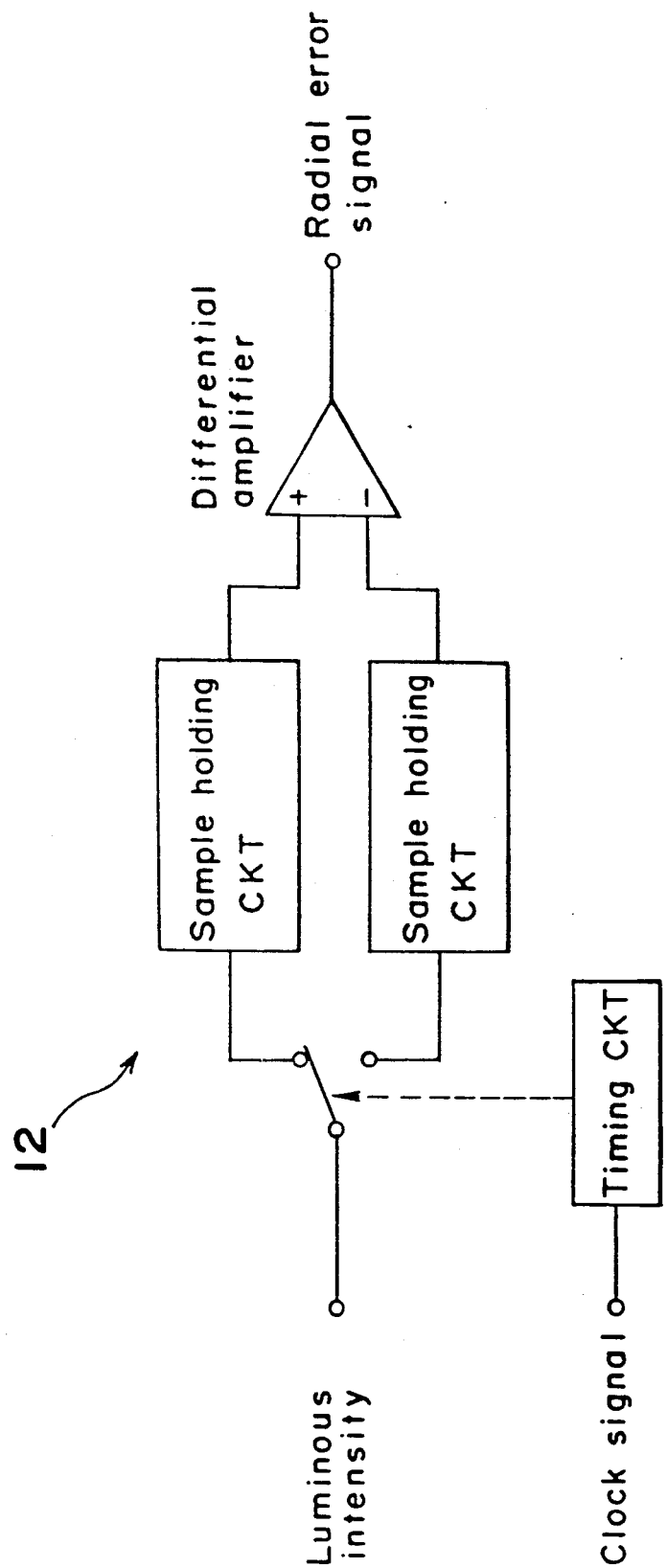
FIG. 3 is a circuit diagram of a signal processor of the sampled servo type optical memory element.
Figure 4A:
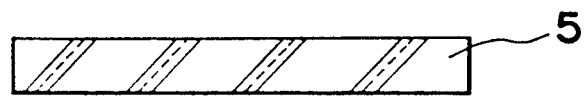
FIGS. 4a to 4f are sectional views showing processes for forming pits on a glass substrate in a prior art manufacturing method of an optical memory element.
Figure 4B:
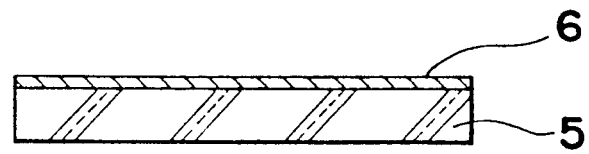
Figure 4C:
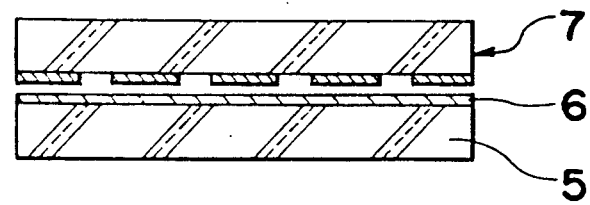
Figure 4D:
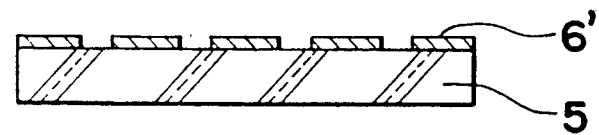
Figure 4E:
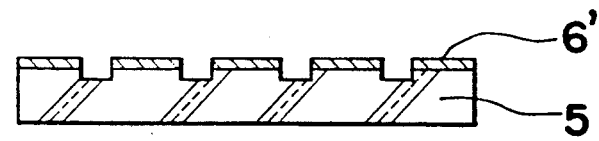
Figure 4F:
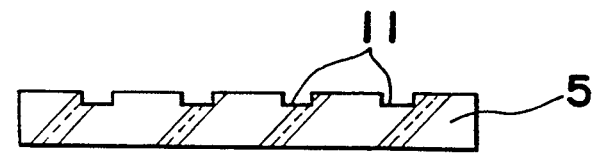
Figure 5A:
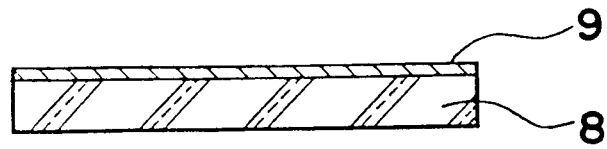
FIGS. 5a to 5f are sectional views showing manufacturing processes of a photomask in the prior art manufacturing method of FIGS. 4a to 4f.
Figure 5B:
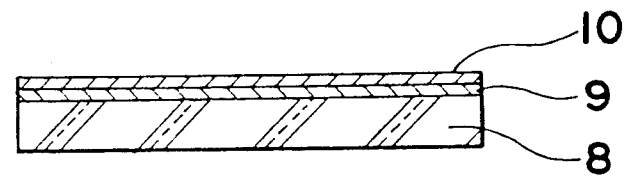
Figure 5C:
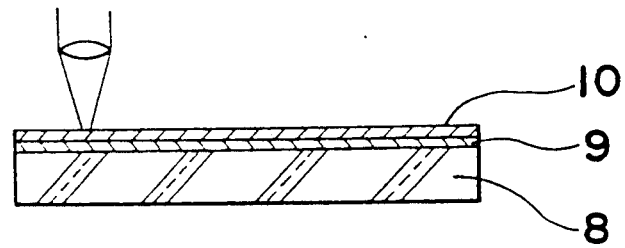
Figure 5D:
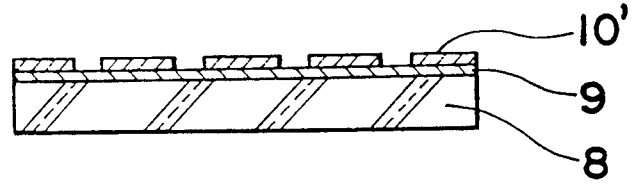
Figure 5E:
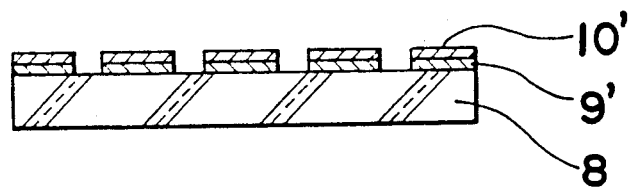
Figure 5F:
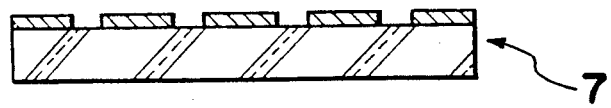
Figure 6:
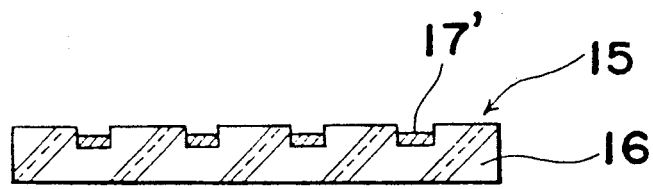
FIG. 6 is a sectional view of a photomask used in a method of manufacturing an optical memory element, according to one embodiment of the present invention.

Referring now to the drawings, there is shown in FIGS. 6 to 9, a method of manufacturing an optical memory element and a photomask 15 used in manufacture of the optical memory element, according to one embodiment of the present invention. As shown in FIG. 6, the photomask 15 for manufacturing the optical memory element is constituted by a transparent substrate 16 acting as portions having a high light transmittance against exposure light and a metallic film pattern 17' acting as portions having a low light transmittance against exposure light. In the photomask 15, the metallic film pattern 17' corresponds to portions for forming pits, namely, a pattern of the pits 21 formed on a glass substrate 19 as will be described later. The metallic film pattern 17' is so provided as to be wholly embedded in the transparent substrate 16. Needless to say, the metallic film pattern 17' may also be so provided as to be partially embedded in the transparent substrate 16.

In the photomask 15 of the above described arrangement, the portions having a low light transmittance are limited to the portions for forming the pits 21 and the remaining portions are the portions having a high light transmittance. Therefore, light transmission of the photomask 15 as a whole is increased remarkably. Furthermore, since the metallic film pattern 17', i.e. the portions having a low light transmittance are so provided as to be partially or wholly embedded in the transparent substrate 16, the metallic film pattern 17' is less likely to suffer damage or failure as compared with an arrangement in which the metallic film pattern 17' projects from the surface the transparent substrate 16. Therefore, the photomask 15 can be handled with much ease and is highly reliable in operation.

Figure 7A:
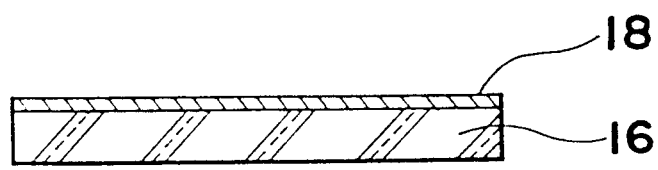
FIGS. 7a to 7f are sectional views showing manufacturing processes of the photomask of FIG. 6.
Figure 7B:
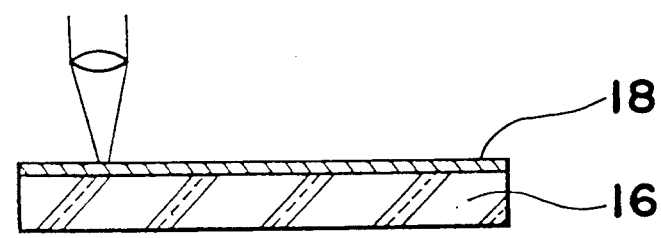
Figure 7C:
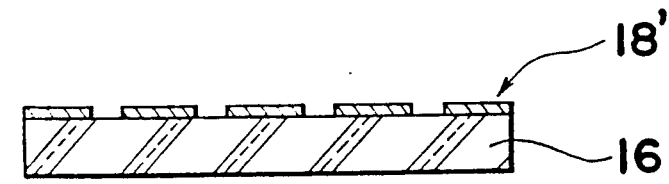
Figure 7D:
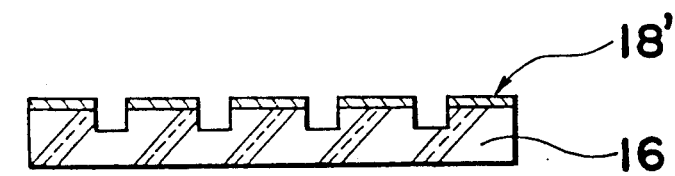
Figure 7E:
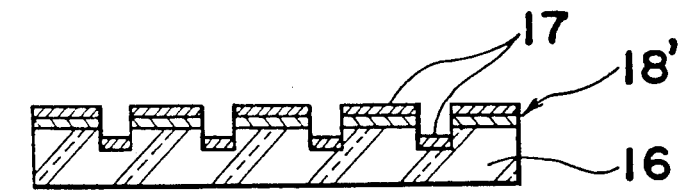
Figure 7F:
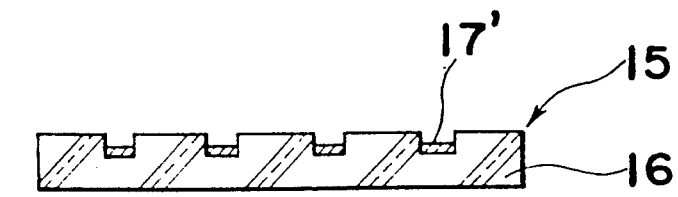

In order to manufacture the photomask 15 referred to above, a positive type photoresist 18 is initially coated on the transparent substrate 16 made of glass or quartz as shown in FIG. 7a. Then, as shown in FIG. 7b, laser beams are irradiated onto the photoresist 18 so as to cut the photoresist 18 into a desired pattern, for example, a pattern of sampled format. Subsequently, as shown in FIG. 7c, the pattern is developed into a photoresist pattern 18'. Then, as shown in FIG. 7d, the glass substrate 16 is etched such that recesses are formed in the glass substrate 16. This etching may be an arbitrary one of so-called wet etching employing hydrofluoric acid solution or its buffer solution and so-called dry etching in which gas such as $CF_4$ or $CHF_3$ is electrically discharged into plasma such that etching is performed by using the plasma. Thereafter, as shown in FIG. 7e, a metallic film 17 made of, for example, tantalum (Ta), titanium (Ti), chromium (Cr), etc. is formed by deposition or sputtering. The metallic film 17 is formed not only on the photoresist pattern 18', so as to cover the photoresist pattern 18', but in the recesses produced by etching so as to be embedded in the recesses. Finally, as shown in FIG. 7f, the photoresist pattern 18' is removed by using a proper solvent or stripping agent and thus, the photomask 15 is obtained. Meanwhile, when the photoresist pattern 18' is removed, the metallic film 17 disposed on the photoresist pattern 18' is also removed at the same time. Therefore, these portions of the photomask 15, which have the metallic film 17 and the photoresist pattern 18' removed therefrom, occupy the portions having a high light transmittance. On the other hand, since the metallic film 17 embedded in the recesses of the transparent substrate 16 remain in the recesses as it is, the metallic film pattern 17' is formed by the metallic film 17 so as to form the portions having a low light transmittance.

Figure 8A:
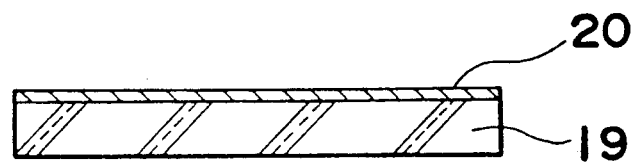
FIGS. 8a to 8e are sectional views showing processes for forming pits on a glass substrate in the method of the present invention.
Figure 8B:
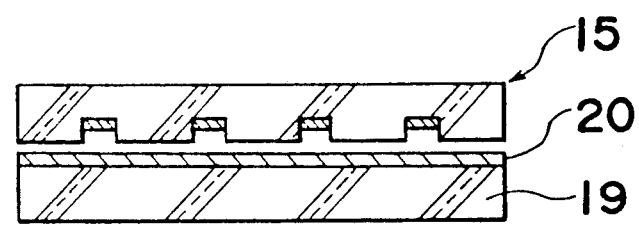

Hereinbelow, the method of manufacturing the optical memory element by using the above described photomask 15 is described with reference to FIGS. 8a to 8e. Initially, as shown in FIG. 8a, a photoresist 20 is coated on a glass substrate 19. Then, as shown in FIG. 8b, the photomask 15 is laid on the photoresist 20 in close contact therewith. Then, light is irradiated from above the photomask 15. Hence, light is irradiated onto only portions of the photoresist 20 other than the remaining portions for forming the pits 21 and thus, the portions of the photoresist 20 are solubilized against developing solution. As described above, light transmission of the photomask 15 as a whole is increased greatly. Therefore, when the photomask 15 has been laid on the photoresist 20 on the glass substrate 19 so as to be brought into close contact with the photoresist 20, interference fringes produced by dust, etc. present between the photomask 15 and the photoresist 20 can be observed clearly and thus, it becomes possible to distinguish defective optical memory elements from nondefective optical memory elements easily.

Figure 8C:
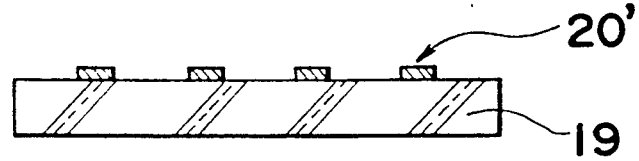
Figure 8D:
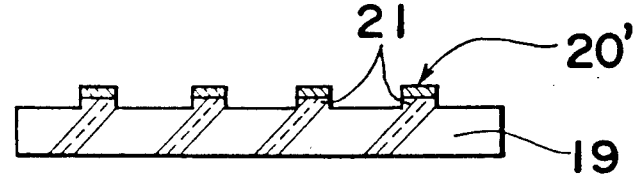
Figure 8E:
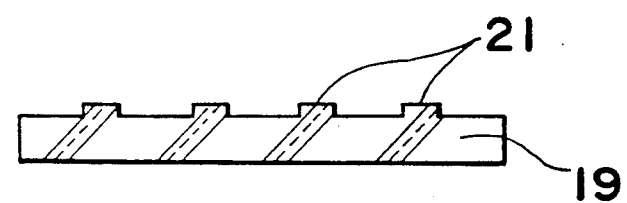
Figure 9:
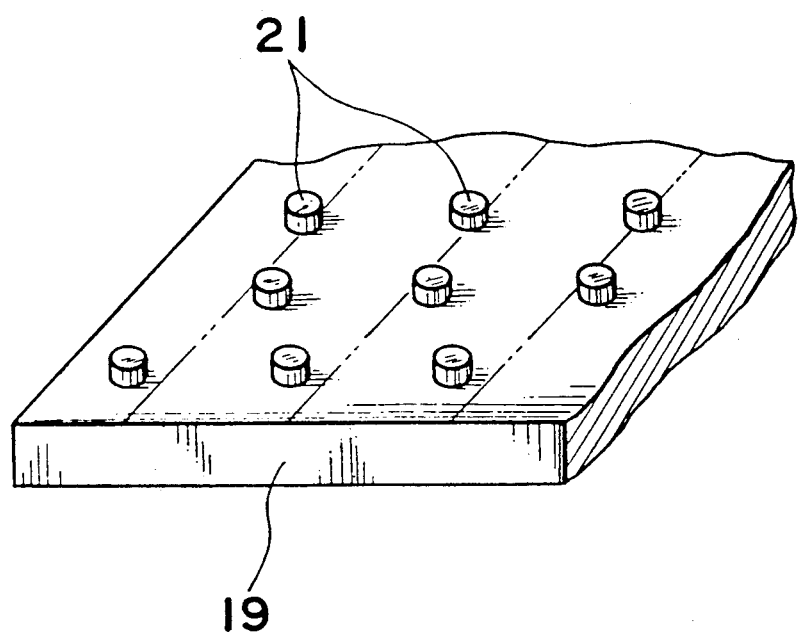
FIG. 9 is a fragmentary perspective view of the glass substrate of FIGS. 8a to 8e.

Then, as shown in FIG. 8c, development of the photoresist 20 is performed so as to remove the solubilized portions of the photoresist 20 such that a photoresist pattern 20' is obtained. Subsequently, as shown in FIG. 8d, etching of the glass substrate 19 is performed so as to directly form, as convex portions, the pits 21 on the surface of the glass substrate 19. Meanwhile, this etching may be an arbitrary one of wet etching and dry etching in the same manner as in etching of the photomask 15 performed during its manufacture referred to earlier. Finally, as shown in FIG. 8e, the photoresist pattern 20' is removed by washing employing oxygen plasma or by using a stripping agent. Thus, as shown in FIG. 9, the pits 21 are convexly formed on the surface of the glass substrate 19. Thereafter, by forming on the surface of the glass substrate 19 a film of recording medium made of magnetooptical material containing Gd-Tb-Fe series amorphous substance, the optical memory element is obtained in which recording, reproduction and erasure of information can be performed and track servo control and focusing servo control can be performed securely by the convex pits 21.

As will be seen from the foregoing description, in the manufacturing method of the optical memory element, according to one aspect of the present invention, when the positive type photoresist coated on the glass substrate is subjected to exposure, the portions of the photoresist other than the remaining portions for forming the pits are solubilized against developing solution by using the photomask capable of irradiating light onto the portions of the photoresist other than the remaining portions for forming the pits and then, are removed.

Subsequently, the glass substrate is etched such that the pits are directly formed, as convex portions, on the surface of the glass substrate. Therefore, in accordance with the manufacturing method of the present invention, since inspection of close contact of the photomask with the photoresist can be performed easily, the high-quality optical memory element can be manufactured. Furthermore, since the pits are convexly formed on the surface of the glass substrate, track servo control and focusing servo control can be performed securely by using the convex pits.

Meanwhile, in the photomask for manufacturing the optical memory element, according to another aspect of the present invention, the portions for forming the pits are so set as to have a lower light transmittance against exposure light than the remaining portions and these portions having a low light transmittance are partially or wholly embedded in the transparent substrate.

In accordance with the photomask of the present invention, light transmission of the photomask as a whole is increased greatly. Thus, when the photomask has been laid on the photoresist on the glass substrate so as to be brought into close contact with the photoresist, interference fringes produced by dust, etc. present between the photomask and the photoresist can be clearly observed, so that manufacture of defective optical memory elements can be prevented in advance. In addition, since the portions having a low light transmittance are so provided as to be partially or wholly embedded in the transparent substrate, the portions having a low light transmittance are less likely to sustain damage or failure as compared with an arrangement in which the portions having a low light transmittance project from the surface of the transparent substrate. Therefore, the photomask of the present invention can be handled easily and has remarkably excellent reliability.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A method of manufacturing a sampled servo type optical memory which includes discontinuous raised convex portions which are followed by a laser beam spot of a tracking apparatus to provide tracking, comprising the steps of:
   exposing a positive type photoresist coated on a glass substrate by using a photomask to irradiate light onto first portions of the photoresist to solubilize the first portions of the photoresist against developing solution and to prevent irradiation of second portions of the photoresist;
   developing the photoresist by using a developing solution so as to remove the first portions of the photoresist; and
   etching the glass substrate corresponding to the removed first portions of the photoresist so as to directly form the discontinuous raised convex portions on a surface of the glass substrate corresponding to the second portions of the photoresist.

2. The method of manufacturing a sampled servo type optical memory as claimed in claim 1, wherein the photomask is formed on a transparent substrate with embedded portions which correspond to the second portions of the photoresist.

3. The method of manufacturing a sampled servo type optical memory as claimed in claim 2, wherein the transparent substrate is made of quartz.

4. The method of manufacturing a sampled servo type optical memory as claimed in claim 2, wherein the transparent substrate is made of glass.

5. The method of manufacturing a sampled servo type optical memory as claimed in claim 2, wherein the embedded portions of the transparent substrate of the photomask are made of tantalum.

6. The method of manufacturing a sampled servo type optical memory photomask as claimed in claim 2, wherein the embedded portions of the transparent substrate of the photomask are made of tantalum.

7. A method of manufacturing a sampled servo type optical memory which includes discontinuous raised convex portions which are followed by a laser beam spot of a tracking apparatus to provide tracking, using a photomask which has a transparent substrate with embedded first portions of opaque material, comprising the steps of:
   coating a layer of photoresist on a first surface of a glass substrate;
   aligning the photomask above the glass substrate in close proximity to the layer of photoresist;
   irradiating the layer of photoresist through the photomask with a light source, portions of the layer of photoresist corresponding to second portions of the photomask other than the first portions being solubilized against developing solution and interference fringes produced by dust present between the photoresist layer and the photomask being visible;
   developing the layer of photoresist to remove the portions of the layer of photoresist corresponding to the second portions of the photomask which were solubilized; and
   etching the glass substrate to form the optical memory, the raised convex portions corresponding to the first portions of the photomask.

8. The method of manufacturing a sampled servo type optical memory of claim 7, wherein the first portions of the opaque material of the photomask are formed partially or wholly embedded within the transparent substrate.

9. The method of manufacturing a sampled servo type optical memory of claim 8, wherein the first portions of opaque material of the photomask are formed of tantalum.

10. The method of manufacturing a sampled servo type optical memory of claim 8, wherein the first portions of opaque material of the photomask are formed of chromium.

11. The method of manufacturing a sampled servo type optical memory of claim 8, wherein the transparent substrate of the photomask is made of glass.

12. The method of manufacturing a sampled servo type optical memory of claim 8, wherein the transparent substrate of the photomask is made of quartz.

13. The method of manufacturing a sampled servo type optical memory of claim 7, said step of coating comprising coating a layer of positive type photoresist on the glass substrate.

* * * * *